(12) United States Patent
Huang et al.

(10) Patent No.: US 11,807,539 B2
(45) Date of Patent: Nov. 7, 2023

(54) HEAT EXCHANGER AND MANUFACTURING METHOD THEREOF

(71) Applicant: Hangzhou Sanhua Research Institute Co., Ltd., Zhejiang (CN)

(72) Inventors: Hai Huang, Zhejiang (CN); Jianhua Tang, Zhejiang (CN); Ming Xue, Zhejiang (CN); Shurui Yu, Zhejiang (CN); Linjie Huang, Zhejiang (CN)

(73) Assignee: Hangzhou Sanhua Research Institute Co., Ltd., Hangzhou (CN)

( * ) Notice: Subject to any disclaimer, the term of this patent is extended or adjusted under 35 U.S.C. 154(b) by 35 days.

(21) Appl. No.: 17/730,842

(22) Filed: Apr. 27, 2022

(65) Prior Publication Data

US 2022/0250921 A1 Aug. 11, 2022

Related U.S. Application Data

(63) Continuation-in-part of application No. PCT/CN2021/142552, filed on Dec. 29, 2021.

(30) Foreign Application Priority Data

Jan. 8, 2021 (CN) .......................... 202110023747.9

(51) Int. Cl.
*C01B 33/159* (2006.01)
*F28F 19/06* (2006.01)
(Continued)

(52) U.S. Cl.
CPC .......... *C01B 33/159* (2013.01); *C01G 23/04* (2013.01); *C09D 1/00* (2013.01); *C09D 7/62* (2018.01);
(Continued)

(58) Field of Classification Search
CPC ........ C01B 33/159; F29F 21/00; C01G 23/04; C09D 1/00; C01P 2004/64; F28F 19/06; F28F 2245/02; B82Y 30/00
(Continued)

(56) References Cited

U.S. PATENT DOCUMENTS

| 6,338,876 B1 * | 1/2002 | Ishii ....................... F28F 13/18 |
| | | 427/419.1 |
| 2016/0032163 A1 | 2/2016 | Kim et al. |

FOREIGN PATENT DOCUMENTS

| CN | 101139708 A | 3/2008 |
| CN | 101260521 A | 9/2008 |

(Continued)

OTHER PUBLICATIONS

International Search Report of PCT Application No. PCT/CN2021/142552, dated Mar. 3, 2022, in 4 pages.
(Continued)

*Primary Examiner* — Joel M Attey
(74) *Attorney, Agent, or Firm* — Knobbe, Martens, Olson & Bear LLP (57) ABSTRACT

The present application provides a heat exchanger and a manufacturing method of a heat exchanger. The heat exchange includes a metal substrate having a fluid channel for circulating a heat exchange medium. The heat exchanger includes a coating having a rare earth conversion coating and a hydrophilic coating. The rare earth conversion coating is arranged to cover at least part of a surface of the metal substrate, and the rare earth conversion coating includes a rare earth element-containing compound. At least part of the hydrophilic coating is further away from the metal substrate than the rare earth conversion coating. A surface of the heat exchanger is hydrophilic, which is conducive to the dis-
(Continued)

charge of condensate water, and can improve corrosion resistance and prolong a service life of the heat exchanger.

19 Claims, 4 Drawing Sheets

(51) Int. Cl.
  *C09D 1/00* (2006.01)
  *C01G 23/04* (2006.01)
  *C09D 7/62* (2018.01)
  *B82Y 30/00* (2011.01)
  *F28F 21/00* (2006.01)

(52) U.S. Cl.
  CPC ............... *F28F 19/06* (2013.01); *B82Y 30/00* (2013.01); *C01P 2004/64* (2013.01); *F28F 21/00* (2013.01); *F28F 2245/02* (2013.01)

(58) Field of Classification Search
  USPC ........................................................ 165/133
  See application file for complete search history.

(56) References Cited

FOREIGN PATENT DOCUMENTS

| | | |
|---|---|---|
| CN | 102226665 A | 10/2011 |
| CN | 102766840 A | 11/2012 |
| CN | 203024637 U | 6/2013 |
| CN | 103555114 A | 2/2014 |
| CN | 103923501 A | 7/2014 |
| CN | 103924182 A | 7/2014 |
| CN | 104231683 A | 12/2014 |
| CN | 104312310 A | 1/2015 |
| CN | 104374123 A | 2/2015 |
| CN | 104725640 A | 6/2015 |
| CN | 105953478 A | 9/2016 |
| CN | 105953627 A | 9/2016 |
| CN | 108261086 A | 7/2018 |
| JP | 60116762 A | 6/1985 |
| JP | 04148196 A | 5/1992 |

OTHER PUBLICATIONS

Office Action received in Chinese Application No. 202110023747.9 dated Nov. 17, 2022 in 20 pages.

* cited by examiner

HEAT EXCHANGER AND MANUFACTURING METHOD THEREOF

CROSS REFERENCE TO RELATED APPLICATIONS

This application claims priority to Chinese Patent Application No. 202110023747.9, entitled "HEAT EXCHANGER AND MANUFACTURING METHOD THEREOF" and filed on Jan. 8, 2021, the entire contents of which are incorporated herein by reference. Any and all applications for which a foreign or domestic priority claim is identified in the Application Data Sheet as filed with the present application are incorporated by reference and made a part of this specification.

TECHNICAL FIELD

The present application relates to the field of heat exchange and material technologies, and in particular, to a heat exchanger and a manufacturing method thereof.

BACKGROUND

In the related art, moisture in the air may condense on a surface of a heat exchanger, which makes it is liable to form a moisture environment on a metal surface of the heat exchanger, and the metal surface of the corresponding heat exchanger is also prone to electrochemical corrosion. Some improvement methods are to provide a chromite passivation coating on the surface of the heat exchanger, so as to delay corrosion to some extent. However, as a brazed connection technology is mostly used in the heat exchanger, due to the presence of a brazing agent, it is difficult to coat a chromite coating on a brazed part by reaction, so that the coating on the brazed part is difficult, which may affect the corrosion resistance of the heat exchanger. In addition, chromium salts also have a certain impact on the environment.

Therefore, there is a need to improve the corrosion resistance of the heat exchanger in the related art.

SUMMARY

In view of the above existing problems, the present application provides a heat exchanger with good corrosion resistance. Correspondingly, the present application further provides a manufacturing method of the corresponding heat exchanger.

According to one aspect of the present application, a heat exchanger is provided, the heat exchanger includes a metal substrate having a fluid channel for circulating a heat exchange medium; and a coating including a rare earth conversion coating and a hydrophilic coating, wherein the rare earth conversion coating is arranged to cover at least part of a surface of the metal substrate, and the rare earth conversion coating includes a rare earth element-containing compound; at least part of the hydrophilic coating is further away from the metal substrate than the rare earth conversion coating.

The heat exchanger according to the present application includes a rare earth conversion coating and a hydrophilic coating. The rare earth conversion coating serves as a base coating to cover at least part of a surface of the metal substrate, and at least part of the hydrophilic coating is further away from the metal substrate than the rare earth conversion coating. Therefore, by use of the hydrophilic coating, the surface of the heat exchanger has hydrophilic properties, condensate water is easy to spread on the surface of the heat exchanger, which is conducive to the sliding and discharge of the condensate water and can ameliorate the moisture environment on the surface of the heat exchanger and reduce the penetration of a corrosive medium to a metal matrix. Moreover, the rare earth conversion coating covering at least part of the surface of the metal substrate can block a redox reaction process of the metal substrate, so the corrosion resistance of the heat exchanger may be improved through a synergy between the rare earth conversion coating and the hydrophilic coating.

According to another aspect of the present application, a manufacturing method of the above-described heat exchanger is provided. The manufacturing method of the heat exchanger includes the following steps:

providing a metal substrate, rare earth conversion coating material and hydrophilic coating material, wherein the metal substrate has at least one fluid channel for circulating a heat exchange medium;

applying the rare earth conversion coating material to at least part of a surface of the metal substrate, and curing, wherein the rare earth conversion coating material including a rare earth element-containing compound; and applying the hydrophilic coating material to at least part of a surface of the rare earth conversion coating, and curing it, to obtain the heat exchanger.

According to the manufacturing method of a heat exchanger in the present application, the rare earth conversion coating material is applied to at least part of the surface of the metal substrate, and the hydrophilic coating material is applied to at least part of the surface of the rare earth conversion coating and cured, to finally obtain the heat exchanger. Therefore, the rare earth conversion coating material covering at least part of the surface of the metal substrate can form a rare earth conversion coating after curing, which can block a redox reaction process of the metal substrate, and the hydrophilic coating material covering at least part of the surface of the rare earth conversion coating can form a hydrophilic coating, so as to enable the surface of the heat exchanger to have hydrophilic properties, which is conductive to the sliding and discharge of condensate water, and can ameliorate the moisture environment on the surface of the heat exchanger and reduce the penetration of a corrosive medium to a metal matrix. The manufacturing method of a heat exchanger according to the present application can improve the corrosion resistance of the heat exchanger.

Additional aspects and advantages of the present application will be set forth in part in the description which follows and in part will become apparent from the description or may be learned from practice of the present application.

BRIEF DESCRIPTION OF DRAWINGS

FIG. 9 shows a morphology of a sample prior to a salt spray test according to

Comparative Example 1 of the present application; and

DESCRIPTION OF EMBODIMENTS

In order to make the objectives, technical solutions and advantages of the present application clearer, the technical solutions of the present application will be described clearly and completely below with reference to embodiments of the present application. Obviously, the described embodiments are merely some of rather than all of the embodiments of the present application. All other embodiments acquired by those skilled in the art without creative efforts based on the technical solutions according to the present application and the provided embodiments shall fall within the protection scope of the present application. For specific conditions not specified in the embodiments, routine conditions or conditions recommended by manufacturers are generally used. Reagents or instruments without specified manufacturers are all commercially available products.

The ends points and any value in the ranges disclosed herein are not limited to the exact ranges or values; instead, those ranges or values shall be comprehended as encompassing values that are close to those ranges or values. For numeric ranges, end points of the ranges, end points of the ranges and discrete point values, and the discrete point values may be combined to obtain one or more new numeric ranges.

It is to be noted that the term "and/or" used herein is merely an association relationship describing associated objects, indicating that three relationships may exist. For example, A and/or B indicates that there are three cases of A alone, A and B together, and B alone. As used in the embodiments of the present application and the appended claims, the singular forms of "a/an", "said", and "the" are also intended to include plural forms, unless otherwise clearly specified by the context.

In the description of the present application, a list of items connected by the term "at least one of" or other similar terms may mean any combinations of the listed items. For example, if items A and B are listed, the phrase "at least one of A and B" means only A; only B; or A and B. In another example, if items A, B and C are listed, the phrase "at least one of A, B and C" means only A; or only B; only C; A and B (excluding C); A and C (excluding B); B and C (excluding A); or all of A, B and C. The item A may include a single element or multiple elements. The item B may include a single element or multiple elements. The item C may include a single element or multiple elements. In addition, the terms "at least part", "at least part of a surface" or other similar terms mean any part of the surface or the whole surface of the member. For example, at least part of a surface of a heat exchanger means a part or parts of the surface of the heat exchanger, or the whole surface of the heat exchanger.

In a specific embodiment, the present application is described in further detail below through specific embodiments.

Due to many different features than conventional scale equipment, such as a small volume, a light weight, high efficiency, and high strength, a micro-channel heat exchanger may not only be widely used in fields of chemical, energy and environment, but also trigger technological innovations in efficiency improvement and emission reduction in fields, such as new energy vehicle thermal management systems, home air conditioners, commercial air conditioners and refrigeration equipment.

In the related art, the application of an all-aluminum micro-channel heat exchanger is gradually expanding, but the promotion progress thereof is relatively slow. A major technical bottleneck is as follows. Aluminum/aluminum alloy materials in the all-aluminum micro-channel heat exchanger have poor corrosion resistance, so there is a need to improve the corrosion resistance of the heat exchanger by means of a related corrosion-resistant coating technology. However, corrosion resistance technologies by applying a chromite passivation coating or an anodic oxidation electrophoretic coating, which are commonly used in related fields, still have more or less defects, and thus, there is still a need for improvement. Therefore, how to enable the heat exchanger to have good corrosion resistance and prolong the service life of the heat exchanger has become a problem to be urgently solved in the industry.

Based on this, in the technical solutions of the embodiments of the present application, a heat exchanger capable of improving the corrosion resistance and effectively improving the drainage and a manufacturing method of a heat exchanger are provided, which can improve the corrosion resistance and hydrophilic properties of the heat exchanger in the related art, prolong the service life of the heat exchanger and improve the heat exchange efficiency. See below for descriptions of specific technical solutions.

An embodiment of the present application provides a heat exchanger. The heat exchanger includes a metal substrate. The metal substrate has a fluid channel for circulating a heat exchange medium. The heat exchanger further includes a coating. The coating includes a rare earth conversion coating and a hydrophilic coating. The rare earth conversion coating is relatively closer to a surface of the metal substrate. That is, the rare earth conversion coating and the hydrophilic coating may be sequentially stacked on at least part of an outer surface of the metal substrate of the heat exchanger. The rare earth conversion coating is connected to the metal substrate by covalent bond. The hydrophilic coating is connected to the rare earth conversion coating by covalent bond. The hydrophilic coating is exposed to an environment.

In some embodiments, an outer surface of the metal substrate has an uneven rough surface, and roughness of the rough surface is defined as Ra, and the roughness of the rough surface meets with the following relation: $0.5\ \mu m \leq Ra \leq 10\ \mu m$. Exemplarily, the roughness of the rough surface is 0.5 μm, 1 μm, 2 μm, 3 μm, 4 μm, 5 μm, 6 μm, 7 μm, 8 μm, 9 μm, 10 μm or any value in a range formed by any two of these point values. It may be understood that the roughness of the outer surface of the metal substrate is controlled within the above range, which is conducive to adhesion of the coating.

The coating on the heat exchanger enables the surface of the heat exchanger to have good hydrophilic properties, so that the condensate water is easier to infiltrate and spread on the surface, not prone to the formation of a water bridge in the case of rapid sliding, which can improve the drainage of the fin, and a moisture environment is not easily formed on the surface of the heat exchanger, which is conducive to improving the corrosion resistance, thereby helping prolong the service life of the heat exchanger and improve the heat exchange efficiency.

In some embodiments, the heat exchanger is a microchannel heat exchanger.

In order to facilitate the description, the heat exchanger and the manufacturing method thereof are elaborated in the embodiments of the present application by taking the microchannel heat exchanger as an example of the heat exchanger described above. However, it shall be understood by those skilled in the art that the principles of the present invention or the arrangement of the rare earth conversion coating and the hydrophilic coating may be implemented in any properly arranged heat exchanger, but not limited to the microchannel heat exchanger. In addition, for the sake of clarity and simplicity, descriptions of well-known functions and structures of the heat exchanger may be omitted.

Referring to FIG. 1 to FIG. 5, according to an embodiment of the present application, a main structure of a metal substrate of a heat exchanger 100 includes a collecting pipe 10, a plurality of heat exchange pipes 12 and a fin 13. The collecting pipe 10 includes a first collecting pipe 14 with a first chamber/inner cavity and a second collecting pipe 15 with a second chamber/inner cavity. The first collecting pipe 14 and the second collecting pipe 15 is separated from each other and parallel with each other. The heat exchange pipe 12 could be a micro-channel flat tubes with a row of micro-channels 121. The micro-channels 121 is fluidic communication with the first chamber and the second chamber for flowing refrigerant therebetween. The fin 13 could be corrugated fin sandwiched between two adjacent flat tubes. The fin 13 includes a plurality of crests 131 connecting to one of the two adjacent flat tubes and a plurality of troughs 132 connecting to the other one of the two adjacent flat tubes. A coating layer 11 coated on at least one the surface of the corrugated fin 13, the flat tube 12, and the collecting pipe 10. The coating layer 11 comprises a rare earth conversion coating layer 101 and a hydrophilic coating layer 102. The rare earth conversion coating layer 101 is attached to at least one surface of the corrugated fin 13, the flat tube 12, and the collecting pipe 10.

The hydrophilic coating layer 102 is stacked on the rare earth conversion coating layer 101, and the rare earth conversion coating layer 101 is sandwiched between the hydrophilic coating layer 102 and the at least one surface of the corrugated fin 13, the flat tube 12, and the collecting pipe 10.

Figure 1:
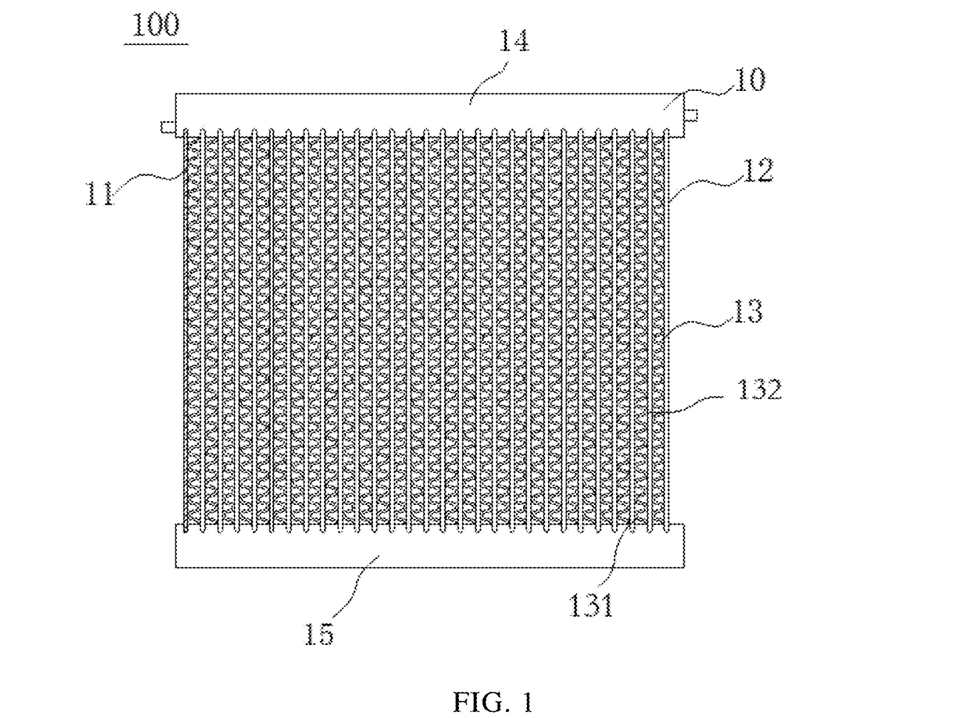
FIG. 1 is a schematic structural diagram of a heat exchanger according to an exemplary embodiment of the present application.
Figure 2:
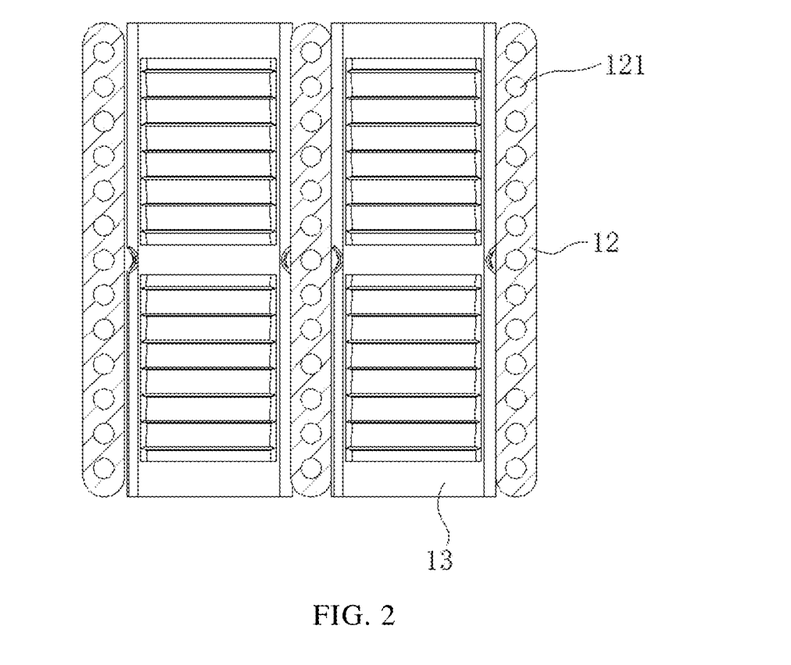
FIG. 2 is a schematic sectional view of fins and heat exchange pipes according to an exemplary embodiment of the present application.
Figure 3:
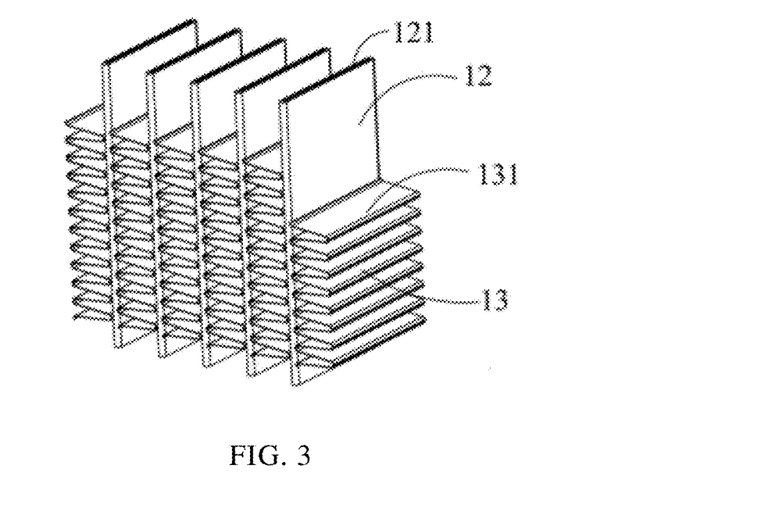
FIG. 3 is a schematic perspective view of fins and heat exchange pipes according to an exemplary embodiment of the present application.

The heat exchange pipes 12 are fixed to the collecting pipe 10. Inner cavities of the heat exchange pipes 12 are communicated with an inner cavity of the collecting pipe 10. The fin 13 is located between two adjacent heat exchange pipes 12. The heat exchange pipes 12 are fixed to the fin 13. The heat exchanger 100 further includes a rare earth conversion coating and a hydrophilic coating 11, where the rare earth conversion coating is arranged on at least part of at least one of a surface of the collecting pipe 10, the heat exchange pipe 12 and the fin 13. The rare earth conversion coating includes a rare earth element-containing compound. The hydrophilic coating is located on a side of the rare earth conversion coating away from the collecting pipe or the heat exchange pipe or the fin. For example, at least part of a surface of the rare earth conversion coating is directly covered with the hydrophilic coating. The hydrophilic coating includes hydrophilic modified silica and/or titanium dioxide. For example, the hydrophilic coating may include hydrophilic modified silica, or titanium dioxide, or both hydrophilic modified silica and titanium dioxide. In some other embodiments, the hydrophilic coating includes hydrophilic modified silica, titanium dioxide and hydrophilic resin. The hydrophilic resin can provide the durability of the hydrophilic coating.

In some embodiments, a static contact angle between the hydrophilic coating and water attached to the hydrophilic coating is less than or equal to 10°, which may be, typically but non-restrictively, for example, 5°, 6°, 7°, 8°, 10° or any value in a range formed by any two of these point values. The static contact angle between the hydrophilic coating and the water in the above range can improve the hydrophilicity of the coating.

In some embodiments, a particle size of the hydrophilic modified silica is in nanometer scale, and the hydrophilic modified silica in nanometer scale is conducive to the formation of a stable hydrophilic coating system.

Figure 4:
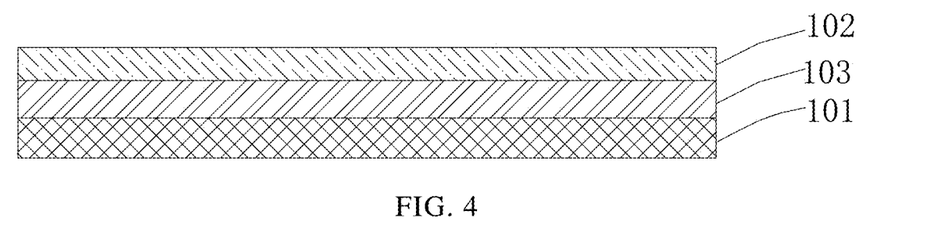
FIG. 4 is a schematic sectional view of a coating portion in the heat exchanger according to an exemplary embodiment of the present application.

Certainly, in some other embodiments, as shown in FIG. 4, a third coating 103 may also be arranged between a hydrophilic coating 102 and a rare earth conversion coating 101. The third coating 103 may cover the rare earth conversion coating 101, or may provide a basis of application for the hydrophilic coating 102. For example, the third coating 103 may be a hydrophobic coating or another functional coating. That is, a surface of at least part of the structure of the heat exchanger is covered with the rare earth conversion coating 101, at least part of a surface of the rare earth conversion coating 101 is covered with the third coating 103, and at least part of a surface of the third coating 103 is covered with the hydrophilic coating 102.

In the heat exchanger 100, at least part of a surface of at least one of the collecting pipe 10, the heat exchange pipe 12 and the fin 13 is provided with a rare earth conversion coating and the hydrophilic coating 11. In particular, at least part of a surface of at least one of the heat exchange pipe 12 and the fin 13 is provided with the rare earth conversion coating, and at least part of a surface of the rare earth conversion coating is provided with the hydrophilic coating. Exemplarily, in FIG. 1, the rare earth conversion coating and the hydrophilic coating 11 is indicated by referring to the leftmost shadowed part on the surface of the heat exchange pipe 12. Certainly, in other embodiments, rare earth conversion coating material and hydrophilic coating material may be applied to surfaces of other heat exchange pipes 12 and fins 13 and/or collecting pipes 10, to form the rare earth conversion coating and the hydrophilic coating.

In FIG. 1, two collecting pipes 10 are provided. The two collecting pipes 10 are arranged in parallel. The plurality of heat exchange pipes are arranged in parallel with each other, and the plurality of heat exchange pipes 12 are connected between the two collecting pipes 10 to communicate with the two collecting pipes. A width of the heat exchange pipe 12 is greater than a thickness of the heat exchange pipe 12, and the heat exchange pipe 12 has a plurality of heat exchange channels extending along a length direction of the heat exchange pipe 12. Therefore, the heat exchange pipe 12 may be a micro-channel flat tube or elliptical tube.

The plurality of heat exchange pipes 12 are arranged along an axial direction of the collecting pipe 10. The fin 13 is wavy along the length direction of the heat exchange pipe 12. A crest portion and a trough portion of the fin 13 are respectively connected to two adjacent heat exchange pipes. The arrangement of the fin 13 can increase a heat exchange area of two adjacent heat exchange pipes, thereby improving the heat exchange efficiency of each heat exchanger pipe. In some embodiments, a partial region of the fin 13 may be provided with a window structure to form a louver fin to further strengthen the heat exchange.

It should be understood that, in the embodiments of the present application, the structure or the number of the components indicated in FIG. 1 does not constitute a specific limitation on the heat exchanger. In some other embodiments of the present application, by comparing with that shown in figures, the heat exchanger may include more or fewer components, or a different number or configuration of collecting pipes, or a different number or configuration of heat exchange pipes, or a different number or configuration of fins, or a different arrangement of components.

In some embodiments, the micro-channel heat exchanger is an all-aluminum micro-channel heat exchanger. For example, the collecting pipe, the heat exchange pipe and the fin in the micro-channel heat exchanger are all made of aluminum/aluminum alloy materials. The structure of the micro-channel heat exchanger and the connection relationships between the components are the conventional knowledge in the art, which are not described in detail herein.

Figure 5:
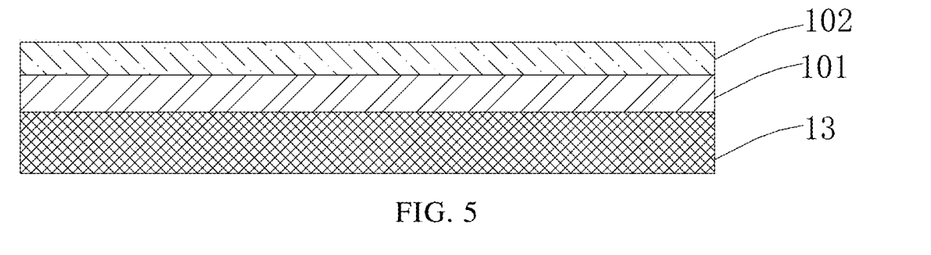
FIG. 5 is a schematic sectional view of a fin portion in the heat exchanger according to an exemplary embodiment of the present application.

Referring to FIG. 5, in some embodiments, at least part of a surface of the fin 13 is covered with the rare earth conversion coating 101, and at least part of a surface of the rare earth conversion coating 101 is covered with the hydrophilic coating 102.

The surface of the heat exchanger has good hydrophilicity, so that the water is easier to infiltrate and spread on the surface, enabling the water to slide better, which may not only improve a drainage effect, but also have a function of delaying the frosting to some extent. In view of the structure features of the micro-channel heat exchanger, a temperature and humidity of the surface of the fin are the most important factors affecting the frosting or drainage of the heat exchanger. In general, low temperature and uneven distribution of the temperature of the surface of the fin may cause uneven distribution of a frost layer and deteriorate heat transfer of the heat exchanger, resulting in acceleration of the frosting. Moreover, louver fins which are mostly used in the micro-channel heat exchanger have a very small fin spacing, which is prone to a phenomenon of "bridge" between condensate water beads, and reduces the drainage performance. In addition, in the case of re-frosting, the condensate water freezes, which is also prone to a phenomenon of frosting aggravation after a second frosting cycle. Therefore, in the micro-channel heat exchanger, at least part of the surface of the fin has the rare earth conversion coating and the hydrophilic coating coated thereon, so as to help improve the drainage of the heat exchanger, improve the efficiency of delaying the frosting, and also ameliorate the moisture environment on the surface of the heat exchanger.

Figure 6:
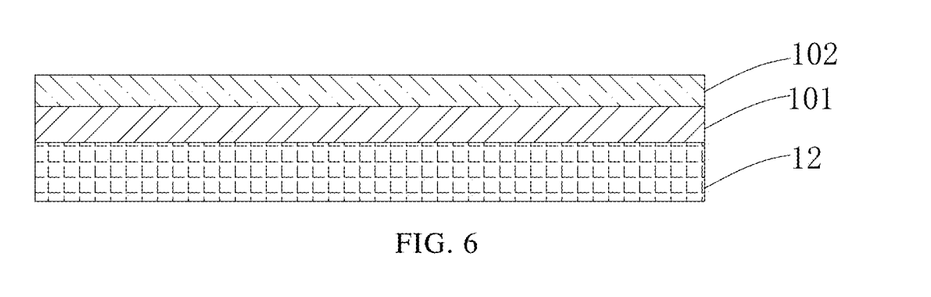
FIG. 6 is a schematic sectional view of a heat exchange pipe portion in the heat exchanger according to an exemplary embodiment of the present application.
Figure 7:
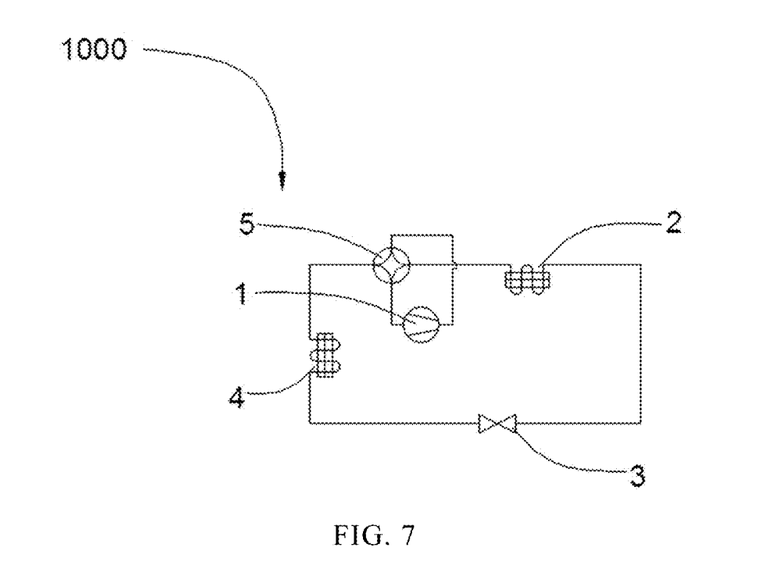
FIG. 7 is a schematic structural diagram of a thermal management system according to an exemplary embodiment of the present application.

Referring to FIG. 6, in some embodiments, at least part of a surface of the heat exchange pipe 12 is covered with the rare earth conversion coating 101, and at least part of a surface of the rare earth conversion coating 101 is covered with the hydrophilic coating 102.

In some embodiments, at least part of a surface of the fin and at least part of a surface of the heat exchange pipe are each covered with the rare earth conversion coating, and at least part of a surface of the rare earth conversion coating is covered with the hydrophilic coating.

In some embodiments, the rare earth conversion coating includes a rare earth element-containing compound; and the hydrophilic coating includes at least one of hydrophilic modified silica and titanium dioxide. In particular, the hydrophilic coating includes hydrophilic modified silica and titanium dioxide.

The heat exchanger according to the embodiments of the present application is provided with a rare earth conversion coating and a hydrophilic coating, where the rare earth conversion coating includes a rare earth element-containing compound, and the hydrophilic coating includes at least one of hydrophilic modified silica and titanium dioxide. The rare earth conversion coating may serve as a base coating to cover at least part of a surface of the collecting pipe, at least part of a surface of the heat exchange pipe and/or at least part of a surface of the fin. The hydrophilic coating may serve as a top coating to cover at least part of a surface of the rare earth conversion coating. Therefore, a rare earth conversion treatment is performed on the heat exchanger to form a rear earth conversion coating first, and then a hydrophilic surface treatment is performed on the heat exchanger by using a sol-gel silane hydrophilic coating. The hydrophilic coating may be bonded with the surface of the heat exchanger treated by the rare earth conversion coating through Si—O (silicon-oxygen) covalent bonds, which has the characteristics of tight bonding and good durability. Moreover, by use of the rare earth conversion coating, the density of the coating can be further improved, and a cathodic reduction reaction can be blocked in the presence of local pitting, so as to improve the corrosion resistance of the heat exchanger. Besides, due to contribution of the rare earth conversion coating to the corrosion resistance of the surface of the metal substrate, the surface of the metal substrate is not prone to many locally raised metal corrosive oxides, which has less destructive effect on the hydrophilic coating correspondingly. The rare earth conversion coating in turn helps maintain the durability of the hydrophilic coating. The hydrophilic coating can effectively prevent the shortage of brittleness and hardness of an existing chromite passivation film by using its good hydrophilic properties. Therefore, for the heat exchanger, through a synergy between the rare earth conversion coating and the hydrophilic coating, the corrosion resistance of the heat exchanger is improved, and the service life of the heat exchange is prolonged. Moreover, the surface of the heat exchanger has good hydrophilic properties, so that the condensate water is easier to infiltrate and spread on the surface of the heat exchanger, which is conducive to improving the drainage. Furthermore, when the heat exchanger is applied to an air conditioning system or a heat pump system, it is conducive to prolonging the service life and improving the heat transfer efficiency of the heat exchanger.

Experimental verification shows that the cost of the heat exchanger is reduced by arrangement of the rare earth conversion coating and the hydrophilic coating according to the embodiments of the present application. Compared with existing chromite passivation corrosion resistance treatment or anodic oxidation electrophoretic coating treatment, the material process costs can be reduced by at least 50%. The present application also has the advantage of green environmental protection, and is characterized by good flexibility of the coating and the capability to withstand fin bending with little risk of rupture or delamination.

In the case of meeting the requirements of improving the corrosion resistance of the heat exchanger, the specific type of the rare earth element-containing compound in the rare earth conversion coating may be varied. Specifically, in some embodiments, a rare earth element in the rare earth element-containing compound includes a lanthanide rare earth element. The lanthanide rare earth element includes at least one of a lanthanum element, a cerium element, a praseodymium element, a neodymium element, a promethium element, a samarium element and a europium element. For example, the rare earth element-containing compound may be a lanthanum-containing compound, a cerium-containing compound, a praseodymium-containing compound, a neodymium-containing compound, a promethium-containing compound, a samarium-containing compound, a europium-containing compound, or a mixture of any two or more of the above compounds in any proportion.

In addition, in other embodiments, the rare earth element-containing compound is not limited to those listed above. The rare earth element-containing compound may also be in other types, provided that the requirements of improving the corrosion resistance of the heat exchanger are met, which are not described in detail one by one herein.

In some embodiments, the rare earth element may be a cerium element, and the rare earth element-containing compound may be a cerium-containing compound. Specifically, in some embodiments, the rare earth element-containing compound includes an oxide of cerium (e.g. cerium oxide $CeO_2$) and a hydroxide of cerium (e.g. cerium hydroxide $Ce(OH)_4$). In consideration of extensive sources, easy availability or costs, a cerium-containing compound is selected as the rare earth element-containing compound, and the cerium-containing compound is in a state that $CeO_2$ and $Ce(OH)_4$ are coexisting, so the chemical property is stable, which is conducive to improving a pitting resistance effect and may improve the corrosion resistance of the heat exchanger.

In some embodiments, the hydrophilic coating includes hydrophilic modified silica and titanium dioxide, where a content of the hydrophilic modified silica is higher than a content of the titanium dioxide. The hydrophilic coating contains both hydrophilic modified silica and titanium dioxide, enabling the hydrophilic coating to form a structure with relatively stable physical and chemical properties, so that the hydrophilic coating is stable and dense, and the hydrophilicity of the coating can be further improved to achieve good hydrophilicity, durability and corrosion resistance.

In some embodiments, a weight per unit area of the rare earth conversion coating is controlled in a range of 0.75 g/m2 to 1.2 $g/m^2$. An average weight per unit area of the rare earth conversion coating may be no less than 0.75 $g/m^2$, and further, may be greater than or equal to 0.75 $g/m^2$ and less than or equal to 1.2 $g/m^2$. In some embodiments, a weight per unit area of the hydrophilic coating is controlled in a range of 4 $g/m^2$ to 10 $g/m^2$. An average weight per unit area of the hydrophilic coating may be no less than 4 $g/m^2$, and further, may be greater than or equal to 4 $g/m^2$ and less than or equal to 10 $g/m^2$. The suitable weights per unit area of the rare earth conversion coating and the hydrophilic coating may effectively improve the corrosion resistance and drainage of the heat exchanger without having negative influences on the heat exchange efficiency.

In some embodiments, the present application further provides a manufacturing method of a heat exchanger, where the heat exchanger may be the heat exchanger described in any one of the above embodiments. The manufacturing method may include the following steps:

(a) providing a metal substrate, rare earth conversion coating material and hydrophilic coating material are provided, wherein the metal substrate has at least one fluid channel for circulating a heat exchange medium;

(b) applying a rare earth conversion coating material to at least part of a surface of the metal substrate, and curing, to form a rare earth conversion coating including a rare earth element-containing compound; and (c) applying a hydrophilic coating material to at least part of a surface of the rare earth conversion coating, and curing, to form a hydrophilic coating including hydrophilic modified silica and/or titanium dioxide, to obtain the heat exchanger.

It should be understood that, during the manufacturing of the heat exchanger, the rare earth conversion coating material and the hydrophilic coating material may be obtained first, and then the rare earth conversion coating material and the hydrophilic coating material are sequentially applied to at least part of the surface of the metal substrate of the heat exchanger. Certainly, in specific embodiments of the present application, a sequence of preparation of the rare earth conversion coating material and the hydrophilic coating material is not excessively limited. For example, the rare earth conversion coating material may be prepared first, which is followed by preparation of the hydrophilic coating material, or the hydrophilic coating material may be prepared first, which is followed by preparation of the rare earth conversion coating material, or the rare earth conversion coating material and the hydrophilic coating material are prepared at the same time.

A manufacturing process of the heat exchanger is simple, easy to control, and highly feasible, with easy reaction and mild reaction conditions, which has less pollution to the environment, and has the advantages of green environmental protection, and is suitable for industrial scale production. The heat exchanger obtained via the manufacturing method has good hydrophilicity, which is conducive to the discharge of the condensate water, can improve the heat exchange efficiency, and can also improve the corrosion resistance and prolong the service life of the heat exchanger.

It is to be understood that the manufacturing method of a heat exchanger and the heat exchanger are based on a same invention concept. Related features such as the specific structure of the heat exchanger or the composition of the coating may be obtained with reference to the description of the part of the heat exchanger, which are not described in detail herein.

In some embodiments, the heat exchanger according to the present application is a micro-channel heat exchanger. The metal substrate includes at least one of a collecting pipe 10, a heat exchange pipe 12 and a fin 13. Specifically, the metal substrate includes at least one collecting pipe 10, a plurality of heat exchange pipes 12 and at least one fin 13. The heat exchange pipes 12 are fixed to the collecting pipe 10, and inner cavities of the heat exchange pipes 12 are communicated with an inner cavity of the collecting pipe 10. The fin 13 is fixed between two adjacent heat exchange pipes 12. Rare earth conversion coating material is applied to at least part of a surface of at least one of the collecting pipe 10, the heat exchange pipe 12 and the fin 13 and cured to form a rare earth conversion coating including a rare earth element-containing compound.

In some embodiments, the rare earth conversion coating material includes the following parts by mass of raw materials:

1 to 3 parts by mass of a rare earth raw material, 94 to 96 parts by mass of water, 1.5 to 4.5 parts by mass of an oxidant and optionally, 0 to 1 part by mass of an accelerant.

It shall be noted that the "optionally" means that the accelerant may be selectively added or not. That is, the raw material of the rare earth conversion coating material may or contain an accelerant or not. For example, in some embodiments, the rare earth conversion coating material includes the following parts by mass of raw materials: 1 to 3 parts by mass of a rare earth raw material, 94 to 96 parts by mass of water and 1.5 to 4.5 parts by mass of an oxidant. In some other embodiments, the rare earth conversion coating material includes the following parts by mass of raw materials: 1 to 3 parts by mass of a rare earth raw material, 94 to 96 parts by mass of water, 1.5 to 4.5 parts by mass of an oxidant and 0 to 1 part by mass of an accelerant.

When the accelerant is of 0 part by mass, the accelerant is not added. The accelerant is able to promote a process of a redox reaction on the surface of aluminum, for example, to turn Al better into $Al^{3+}$ and an electron e. Therefore, when the accelerant is added, the redox reaction on the surface of aluminum can be accelerated and the reaction efficiency can be improved, while the redox reaction on the surface of aluminum is relatively slow when the accelerant is not added.

The rare earth conversion coating material is mainly prepared from a rare earth raw material, water, an oxidant and an optional accelerant that are suitable and in appropriate amounts. When the rare earth conversion coating material is applied to an all-aluminum micro-channel heat exchanger, a redox reaction may take place on the surface of aluminum to generate a rare earth element-containing compound, which enables at least part of the surface of the heat exchanger to show good properties or structural stability to improve the corrosion resistance.

In order to optimize the amount of each component in the rare earth conversion coating material, improve a synergistic effect of the components, and further improve the corrosion resistance of the coating and other properties to help improve the economic benefits of the coating, in some embodiments, the rare earth conversion coating material includes the following parts by mass of raw materials: 1 to 3 parts by mass of the rare earth raw material, 95.1 parts by mass of the water, 3 to 3.5 parts by mass of the oxidant and optionally, 0.5 to 1 part by mass of the accelerant.

The rare earth raw material is a raw material that can provide a rare earth element, such as a raw material that can provide a cerium (Ce) element. In some embodiments, the rare earth raw material includes, but is not limited to, one or combinations of at least two of a cerium nitrate hexahydrate, a anhydrous cerium nitrate, cerium chloride and a polyhydrous compound thereof, a cerium sulfate and a polyhydrous compound thereof, and a cerium acetate and a polyhydrous compound thereof. The cerium chloride and the polyhydrous compound thereof are an anhydrous cerium chloride and a polyhydrous compound of the cerium chloride, such as a cerium chloride heptahydrate or a cerium chloride octahydrate. Similarly, the cerium sulfate and the polyhydrous compound thereof are an anhydrous cerium sulfate and a polyhydrous compound of the cerium sulfate, such as a cerium sulfate tetrahydrate. The cerium acetate and the polyhydrous compound thereof are an anhydrous cerium acetate and a polyhydrous compound of the cerium acetate, such as a cerium acetate trihydrate or a cerium acetate tetrahydrate.

It is to be understood that the rare earth element may be a cerium element, a lanthanum element, a praseodymium element, a neodymium element, a promethium element, a samarium element, a europium element or other elements. When the rare earth element is a lanthanum element, a praseodymium element, a neodymium element or other elements, a compound that can provide the corresponding element is used as the rare earth raw material.

In some embodiments, the oxidant includes, but is not limited to, at least one of hydrogen peroxide, sodium perchlorate, and tert-butyl hydroperoxide. For example, the oxidant may be an aqueous hydrogen peroxide solution where a mass concentration of hydrogen peroxide is about 27.5 wt. % to 30 wt. %, or the oxidant may be sodium perchlorate, or the oxidant may be an aqueous tert-butyl hydroperoxide solution or a tert-butanol solution of tert-butyl hydrogenperoxide where a mass concentration of tert-butyl hydrogenperoxide is no less than 60 wt. %.

Different oxidants have slightly different oxidability or related performance In practical applications, when different oxidants are used, the content of each oxidant may be adjusted appropriately. For example, when hydrogen peroxide is used as the oxidant, hydrogen peroxide is 1.5 to 4.5 parts by mass. When tert-butyl hydrogenperoxide is used as the oxidant, tert-butyl hydrogenperoxide is 1.2 to 3.6 parts by mass. When sodium perchlorate is used as the oxidant, sodium perchlorate is 1.5 to 4.5 parts by mass. Tert-butyl hydrogenperoxide has better oxidability and a better application effect, so its addition amount may be appropriately reduced.

In some embodiments, the accelerant includes, but is not limited to, sodium chloride. On the basis of meeting the requirement of promoting the redox reaction process on the surface of aluminum, other types of accelerants may also be used.

In some embodiments, the water may be deionized water.

Further, in some embodiments, a preparation method of the rare earth conversion coating material includes: as counted in parts by mass, dissolving 1 to 3 parts by mass of a rare earth raw material in 94 to 96 parts by mass of water, to obtain a solution A; heating the solution A to 45° C. to 55° C., and then adding 1.5 to 4.5 parts by mass of an oxidant to the solution A to obtain the rare earth conversion coating material.

In some embodiments, the preparation method further includes: heating to 30° C. to 55° C. after adding the oxidant to solution A and prior to obtaining the rare earth conversion coating material. That is, the preparation method of the rare earth conversion coating material includes: as counted in parts by mass, dissolving 1 to 3 parts by mass of a rare earth raw material in 94 to 96 parts by mass of water, to obtain a solution A; heating the solution A to 45° C. to 55° C., then adding 1.5 to 4.5 parts by mass of an oxidant to the solution A to obtain a solution B, and heating the solution B to 30° C. to 55° C. to obtain the rare earth conversion coating material. A film forming effect of the rare earth conversion coating material is slightly different at different temperatures. A heating condition of heating the solution B to 30° C. to 55° C. is conducive to better film-forming bonding between the rare earth conversion coating material and the surface of the heat exchanger, and conducive to the reaction process of the rare earth element on the surface of the metal matrix.

In some specific embodiments, the preparation method of the rare earth conversion coating material includes: as counted in parts by mass, mixing 1 to 3 parts by mass of a rare earth raw material, i.e., cerium nitrate hexahydrate, and 0.5 to 1 part of an accelerant, i.e., sodium chloride, to obtain a mixture, adding the mixture to 95.1 parts by mass of deionized water, and stirring mechanically until the solid is completely dissolved, to obtain a colorless and transparent solution A; and heating the solution A to 45° C. to 55° C. with a water bath, then adding 1.5 to 4.5 parts by mass of an oxidant, i.e., aqueous hydrogen peroxide (27.5 wt. %) solution, to the solution A, to obtain a solution B, and continuously heating the solution B to 30° C. to 55° C., to obtain the rare earth conversion coating material.

Further, during the manufacturing of the heat exchanger containing the rare earth conversion coating, according to the present application, at least one of the collecting pipe, the heat exchange pipe and the fin is pretreated first, and then the prepared rare earth conversion coating material is applied to at least part of the surface of at least one of the collecting pipe, the heat exchange pipe and the fin and cured to form a rare earth conversion coating including a rare earth element-containing compound.

Specifically, in some embodiments, the surfaces of the heat exchange pipe and/or the fin of the heat exchanger are pretreated, and pretreating steps of the heat exchanger specifically include: performing a sandblasting treatment of 100 to 200 meshes on the surfaces of the heat exchange pipe and/or the fin of the heat exchanger, cleaning the surfaces of the heat exchange pipe and/or the fin with alcohol or acid, and then drying them at 35° C. to 50° C.

Further, during the pretreating, in some embodiments, a number of sandblasted meshes ranges from 120 to 180. For example, the number of sandblasted meshes is 150. A drying temperature ranges from 35° C. to 50° C., which further ranges from 38° C. to 45° C. in some embodiments, for example, 40° C. The cleaning manner used may be, for example, ultrasonic cleaning with anhydrous ethanol or cleaning by acid etching.

In some embodiments of the present application, the rare earth conversion coating material may be applied to the pretreated surface of the heat exchanger by, but not limited to, at least one of dip coating, spray coating, brush coating, curtain coating and roller coating. In view of the convenience of implementation, the rare earth conversion coating material according to the embodiments of the present application may be applied to the pretreated surfaces of the heat exchange pipe and/or the fin by spray coating or dip coating. For example, the pretreated heat exchanger may be immersed in the rare earth conversion coating material and stand for 30 min to 50 min by maintaining the temperature at 30° C. to 55° C., so that the rare earth conversion coating material can undergo a redox reaction on the surface of aluminum and form a rare earth conversion coating. Then, the heat exchanger with the rare earth conversion coating is taken out and dried by cold air or dried in the air naturally. In that case, equations involved in the oxidation reaction of the rare earth conversion coating material on the surface of aluminum may be shown below:

reaction on the surface of aluminum: anode (oxidation reaction): $Al \rightarrow Al^{3+} + 3e$ cathode (reduction reaction): $O_2 + 2H_2O + 4e \rightarrow 4OH^-$ $H_2O_2 + 2e \rightarrow 2OH^-$ $Ce^{3+}OH^- + \frac{1}{2}H_2O_2 \rightarrow Ce(OH)_2^{2+}$ $Ce(OH)_2^{2+} + 2OH^- \rightarrow Ce(OH)_4$ $Ce(OH)_4 \rightarrow CeO_2 + 2H_2O$ As can be seen, the rare earth conversion coating contains a mixture of $Ce(OH)_4$ and $CeO_2$. In this way, the chemical property is stable, which is conducive to improving the pitting resistance effect and improving the corrosion resistance of the heat exchanger.

Further, the hydrophilic coating material may be a mixture of hydrophilic modified silica sol and titanium dioxide sol. In some embodiments, as counted in parts by mass, parts by mass of the components in the hydrophilic coating material are: 90 to 92 parts by mass of hydrophilic modified silica sol and 4 to 6 parts by mass of titanium dioxide sol.

Herein, percentages, proportions or parts referred to are calculated by mass unless otherwise stated. "Part by mass" refers to a basic unit of measurement of a mass proportion of multiple components. 1 part may represent any unit mass. For example, 1 part may be expressed as 1 g, 1.68 g, 5 g, 8 g, or the like.

In the preparation of the hydrophilic modified silica by a sol-gel process, there are a large number of Si—OH groups on the surface of silica, which has reactive group hydroxyl (—OH). Through the interaction between the particles, a dense coating with excellent hydrophilicity can be obtained. The hydrophilic modified silica sol included in the hydrophilic coating material according to the embodiment of the present application is 90 to 92 parts by mass, which may be, typically but non-restrictively, for example, 90 parts, 90.5 parts, 90.8 parts, 91 parts, 91.2 parts, 91.5 parts, 92 parts or any value in a range formed by any two of these point values. The content of the hydrophilic modified silica sol in this range helps improve the hydrophilicity of the coating.

Titanium dioxide particles have the characteristics of amphoteric particles and photocatalysis, and have photoinduced superhydrophilic properties. In the preparation of the titanium dioxide particles by a sol-gel process, there are a large number of Ti—OH groups on the surface of the titanium dioxide particles, which has reactive group hydroxyl (—OH). Through the interaction between the particles, a dense coating with excellent hydrophilicity can be obtained. In the hydrophilic coating material according to the embodiment of the present application, the titanium dioxide sol included is 4 to 6 parts by mass, which may be, typically but non-restrictively, for example, 4 parts, 4.5 parts, 4.8 parts, 5 parts, 5.2 parts, 5.5 parts, 5.8 parts, 6 parts or any value in a range formed by any two of these point values. By the content of the titanium dioxide sol in this range, the advantages of hydrophilic modified silica and titanium dioxide can be brought into full play, and their synergistic effect can be enhanced, which help improve the hydrophilicity of the coating.

In some embodiments, the hydrophilic coating material includes the following parts by mass of raw materials: 90 to 92 parts by mass of hydrophilic modified silica sol, 4 to 6 parts by mass of titanium dioxide sol and 3 to 5 parts by mass of a pH modifier.

The embodiments of the present invention has no restrictions on the sources and specific types of the hydrophilic modified silica sol, the titanium dioxide sol, the pH modifier and other raw materials, which may be flexibly selected by those skilled in the art according to actual requirements, provided that the objective of the present invention is not limited. For example, raw materials familiar to those skilled in the art may be used, commercially available products may be used, or raw materials prepared with preparation methods familiar to those skilled in the art may be used. For example, in some embodiments of the present application, in the 90 to 92 parts by mass of the hydrophilic modified silica sol, one part is obtained from commercially available products, and the other part is obtained by the preparation method according to the embodiment of the present application, so that the heat exchanger has a higher heat exchange effect and better drainage. Certainly, in some other embodiments of the present application, the 90 to 92 parts by mass of the hydrophilic modified silica sol may be all obtained from commercially available products. Alternatively, in some other embodiments of the present application, the 90 to 92 parts by mass of the hydrophilic modified silica sol may be all obtained by the preparation method according to the embodiment of the present application.

Specifically, in some embodiments, in the 90 to 92 parts by mass of hydrophilic modified silica sol, 34 to 36 parts by mass of the hydrophilic modified silica sol are prepared by the preparation method according to the embodiment of the present application, and the rest of the silica sol may be commercially available.

The hydrophilic coating material is mainly prepared from the hydrophilic modified silica sol, the titanium dioxide sol and the pH modifier that are suitable and in appropriate amounts. The hydrophilic modified silica sol and the titanium dioxide sol are hydrophilic materials, with a certain reaction active group or hydrophilic group, such as hydroxyl (—OH). Through the interaction between the particles, a dense coating can be obtained, which can play its own chemical stability, weather resistance, hydrophilicity and other basic properties. Therefore, in the hydrophilic coating material according to the embodiments of the present application, through synergistic effect of the hydrophilic modified silica sol, the titanium dioxide sol and the pH modifier with specific contents, a variety of properties are balanced to obtain hydrophilic mixed sol with excellent properties, which enables the hydrophilic coating to have better hydrophilicity.

When applied to the heat exchanger, the hydrophilic coating material can effectively improve the discharge of the condensate water by using its hydrophilic characteristics, ensure the heat exchange effect, make the heat exchanger is easier to be cleaned, and help improve the corrosion resistance of the system.

Further, in order to further optimize the amount of each component in the hydrophilic coating material and enhance the synergistic effect of the components, in some embodiments, the hydrophilic coating material includes the following parts by mass of raw materials: 91 parts by mass of the hydrophilic modified silica sol, 5 parts by mass of the titanium dioxide sol and 4 parts by mass of the pH modifier. Further, in some embodiments, the hydrophilic coating material includes the following parts by mass of raw materials: 35 parts by mass of self-made hydrophilic modified silica sol, 56 parts by mass of commercially available silica sol, 5 parts by mass of the titanium dioxide sol and 4 parts by mass of the pH modifier.

In some embodiments, a preparation method of the self-made hydrophilic modified silica sol includes the following steps:

as counted in parts by mass, mixing 36 to 40 parts by mass of a silane precursor and 50 to 56 parts by mass of a solvent evenly at 45° C. to 55° C., adding 2 to 4 parts by mass of water and 0.5 to 1.5 parts by mass of a surfactant, mixing them evenly, and then adding 1 to 2 parts by mass of acid and 2 to 4 parts by mass of water to react for 22 hours to 24 hours, to obtain the silica sol. Exemplarily, the silane precursor may be, for example, 36 parts, 37 parts, 38 parts, 39 parts, or 40 parts by mass. The solvent may be, for example, 50 parts, 51 parts, 52 parts, 53 parts, 54 parts, 55 parts, or 56 parts by mass. The water may be, for example, 1 part, 1.5 parts, 2 parts, 2.5 parts, 3 parts, 3.5 parts, or 4 parts by mass. The surfactant may be, for example, 0.5 parts, 0.8 parts, 1 part, 1.2 parts, or 1.5 parts by mass. The acid may be, for example, 1 part, 1.2 parts, 1.5 parts, 1.6 parts, 1.8 parts, or 2 parts by mass. A mixing temperature is, for example, 45° C., 46° C., 48° C., 50° C., 52° C., 54° C., 55° C., or the like; and reaction time is, for example, 22 hours, 22.5 hours, 23 hours, 23.5 hours, 24 hours, or the like.

In the case of meeting the hydrophilic properties of the hydrophilic coating material or meeting the requirement of promoting the discharge of the condensate water, the specific type of the silane precursor may be varied. Specifically, in some embodiments, the silane precursor includes 30 to 32 parts by mass of y -glycidyl ether oxypropyl trimethoxysilane (KH-560) and 6 to 8 parts by mass of ethyl orthosilicate. Exemplarily, the KH-560 may be, for example, 30 parts, 31 parts or 32 parts by mass; and the ethyl orthosilicate may be, for example, 6 parts, 7 parts, or 8 parts by mass.

In addition, in other embodiments, the silane precursor is not limited to those listed above. In the case of meeting the hydrophilic properties of the hydrophilic coating material or meeting the requirement of promoting the discharge of the condensate water, the silane precursor may also be in other types, such as hexamethyldisilamine and chlorosilane, which are not described in detail one by one herein.

Using a mixture of KH-560 and ethyl orthosilicate with certain content as the silane precursor is more helpful to obtain silica sol with excellent hydrophilicity, and obtain sol with good hydrophilicity and durability.

In the case of meeting the hydrophilic properties of the hydrophilic coating material or meeting the requirement of promoting the discharge of the condensate water, the specific types of the solvent, the surfactant and the acid may be varied. Specifically, in some embodiments, the solvent includes an alcohol solvent. Further, the alcohol solvent includes an alcohol solvent with a number of carbon atoms ranging from 1 to 10, and optionally, an alcohol solvent with a number of carbon atoms ranging from 1 to 8, and optionally, an alcohol solvent with a number of carbon atoms ranging from 1 to 4. Further, in some embodiments, the solvent is any one of methanol, ethanol and isopropyl alcohol or a mixture of any two or more of methanol, ethanol and isopropyl alcohol in any proportion. Therefore, sources are widely available and costs are low.

In some embodiments, the surfactant includes, but is not limited to, at least one of sodium dodecyl sulfate, sodium dodecyl sulfonate, sodium dodecyl benzene sulfonate and cetyl benzene sulfonate. Further, in some embodiments, the surfactant is sodium dodecyl sulfate. Therefore, costs are low, sources are extensive, and a use effect is good.

In some embodiments, the acid includes, but is not limited to at least one of formic acid and acetic acid. Further, in some embodiments, the acid is formic acid.

In some specific embodiments, a preparation method of the self-made hydrophilic modified silica sol includes the following steps:

as counted in parts by mass, mixing 31 parts by mass of KH-560, 7 parts by mass of ethyl orthosilicate and 54 parts by mass of anhydrous ethanol evenly by mechanical stirring under a water bath condition at 45° C. to 55° C., to obtain a solution C; mixing 3 parts by mass of water and 1 part by mass of sodium dodecyl sulfate evenly, and then adding the mixture to the solution C; then dropping 1 part by mass of formic acid and 3 parts by mass of water to the solution C, mixing them evenly, and reacting for about 24 hours as keeping the above-described reaction conditions unchanged, to obtain the hydrophilic modified silica sol.

Equations or reaction mechanisms involved in the preparation of the silica sol may be shown as follows:

hydrolytic condensation of ethyl orthosilicate:
  1)

hydrolysis of KH560:   2)

polycondensation of KH560: R—Si(OH)₃+R—Si(OH)₃→R—Si(OH)₂—O—Si(OH)₂—R+H₂O,

R—Si(OH)₃+R—Si(OCH₃)₃→R—Si(OH)₂—O—Si(OH)₂—R+CH₃OH, wherein R represents a long chain group —(CH₂)₃—O—CH₂—CH—OCH₂, and KH560 has the following the structural formula (I):

(I)

condensation of KH560 with silicon hydroxyl:
R—Si(OH)₃+Si(OH)₄→R—Si(OH)₂—O—Si(OH)₃+H₂O.     3)

The silica sol prepared according to the embodiments of the present application contains a large number of hydroxyl (—OH) hydrophilic groups, so that the sol shows hydrophilicity, and at the same time, dehydration condensation between hydroxyl groups forms a spatial network structure. Thus, dispersed silica, titanium dioxide and other nanoparticles further added to the hydrophilic coating material are filled into the space network structure, to form a stable sol system, i.e., hydrophilic coating material. The sol of the hydrophilic coating material can be bonded with —OH in a metal base to form covalent bonds by dehydration condensation, which protects the metal base after film-forming, so as to achieve hydrophilicity and corrosion resistance.

Some embodiments of the present application provide a preparation method of the hydrophilic coating material, specifically including: as counted in parts by mass, mixing 90 to 92 parts by mass of the hydrophilic modified silica sol and 4 to 6 parts by mass of the titanium dioxide sol, to obtain a mixture, adjusting a pH value of the mixture to 2.5 to 3.5 by 3 to 5 parts by mass of a pH modifier, and then stirring the mixture to react for 3.5 hours to 5 hours at 45° C. to 55° C., to obtain the hydrophilic coating material.

In the case of meeting the hydrophilic properties of the hydrophilic coating material or meeting the requirement of promoting the discharge of the condensate water, the pH modifier includes organic acid or inorganic acid. Specifically, in some embodiments, the pH modifier is formic acid.

In some specific embodiments, the preparation method of the hydrophilic coating material includes:

preparing the self-made hydrophilic modified silica sol according to the above preparation method; as counted in parts by mass, mixing 35 parts by mass of the self-made hydrophilic modified silica sol, 56 parts by mass of commercially available silica sol and 5 parts by mass of titanium dioxide sol, adjusting a pH value of the system to about 3.0 by using 4 parts by mass of the pH modifier, i.e., formic acid, and then stirring under a water bath condition at 45° C. to 55° C. to react for about 4 hours to 5 hours, to obtain the hydrophilic coating material. The hydrophilic coating material obtained is mixed sol having an enhanced hydrophilic effect.

In the hydrophilic coating material prepared with the above method, the self-made hydrophilic modified silica sol, the commercially available silica sol and the titanium dioxide sol are mixed, which can give full play to the advantages of each component, can obtain mixed sol with good hydrophilicity and durability, and further improve the hydrophilicity of the coating. Surfaces of silica particles have a large amount of Si—OH, with excellent hydrophilicity. Titanium dioxide particles have photoinduced superhydrophilic properties: under light, electrons in a $TiO_2$ valence band are excited to a conduction band, and the electrons and holes migrate to a surface of $TiO_2$ to generate electron hole pairs on the surface.

The electrons react with $Ti^{4+}$, and the holes react with surface oxygen ions, to form positive trivalent titanium ions and oxygen vacancies respectively. In this case, the water in the air is dissociated and adsorbed in the oxygen vacancies and becomes chemisorbed water (surface hydroxyl groups). The chemisorbed water may further adsorb the water in the air and form a physical adsorption layer. That is, a highly hydrophilic micro-zone is formed around a trivalent titanium defect.

In addition, silica particles contained in the self-made hydrophilic modified silica are in nanometer scale, which has good dispersibility, while that contained in the commercially available silica sol may be in micron scale and sub-micron scale. By combining silica particles with different particle sizes, surface morphology, surface energy and hydrophilicity of the coating are improved.

In some embodiments of the present application, method of applying the hydrophilic coating material to the surface of the heat exchanger with a rare earth conversion coating include, but not limited to, at least one of dip coating, spray coating, brush coating, curtain coating and roller coating. In view of the convenience of implementation, the hydrophilic coating material according to the embodiments of the present application may be applied to at least part of the surface of the rare earth conversion coating by spray coating or dip coating. For example, the heat exchanger with a rare earth conversion coating may be immersed by the hydrophilic coating material. The immersion time ranges from 2 min to 5 min, further optionally from 2 min to 3 min. The number of times for dip coating ranges from 2 to 5, and further optionally, from 2 to 3.

In some embodiments, the hydrophilic coating material is applied to the surface of the rare earth conversion coating and then cured. A curing temperature ranges from 180° C. to 220° C., and further optionally, from 190° C. to 210° C., and further optionally, is 200° C. The curing time ranges from 0.5 hours to 2 hours, and further optionally from 0.8 hours to 1.5 hours, and further optionally, is 1 hour.

An embodiment of the present application further provides a thermal management system, including the heat exchanger described above. Specifically, FIG. 5 shows a thermal management system 1000 according to an exemplary embodiment of the present application. The thermal management system 1000 includes at least a compressor 1, a first heat exchanger 2, a throttling device 3, a second heat exchanger 4 and a reversing device 5. The compressor 1 of the thermal management system 1000 may be a horizontal compressor or a vertical compressor. The throttling device 3 may be an expansion valve, or the throttling device 3 is another part that reduces pressure and regulates a flow rate of a refrigerant. The present application document does not specifically limit the type of the throttling device, which may be selected according to an actual application environment and is not described in detail herein. It shall be noted that some systems may not be provided with the reversing device 5. The heat exchanger in the above embodiments of the present application may be used in the thermal management system 1000 as the first heat exchanger 2 and/or the second heat exchanger 4. In the thermal management system 1000, the compressor 1 compresses the refrigerant, a temperature of the refrigerant rises after compression, and then the refrigerant enters the first heat exchanger 2 where the heat is transferred to the outside through heat exchange between the first heat exchanger 2 and the outside, and then the refrigerant passing through the throttling device 3 changes into a liquid state or a gas-liquid two-phase state, in this case, the temperature of the refrigerant decreases, and then the refrigerant at the lower temperature flows to the second heat exchanger 4, and re-enters the compressor 1 after exchanging heat with the outside at the second heat exchanger 4, to achieve circulation of the refrigerant.

In other embodiments of the present application, the coating material in the present application may also be applied to non-heat exchanger products, such as filtration devices in air conditioning systems. Certainly, the coating material according to the embodiments of the present application may be applied to other products requiring improvement in hydrophilicity and/or antibacterial and mildew inhibition. In order to fully explain the hydrophilicity and corrosion resistance of the heat exchanger according to the present application and facilitate the understanding of the present invention, several groups of experimental verification are performed in the present application. The present invention is further described below in conjunction with specific embodiments and comparative examples. It would be understood by those skilled in the art that only some examples are described in the present application and that any other appropriate specific examples all fall within the scope of the present application.

Embodiment 1

1. Preparation of Coating Material (a) Preparation of rare earth conversion coating material: as counted in parts by mass, 1 part by mass of cerium nitrate hexahydrate and 0.6 parts by mass of sodium chloride were mixed, added to 95.1 parts by mass of deionized water, and stirred mechanically until the solid was completely dissolved, to obtain a colorless and transparent solution. The solution was heated to 50° C. with a water bath, then 3.3 parts by mass of an aqueous hydrogen peroxide (27.5 wt. %) solution were added to the solution, and the solution was continuously heated to 50° C. to obtain the rare earth conversion coating material.

(b) Preparation of hydrophilic coating material (b1) As counted in parts by mass, 31 parts by mass of KH-560, 7 parts by mass of ethyl orthosilicate and 54 parts by mass of anhydrous ethanol were mixed evenly by mechanical stirring under a water bath condition at about 50° C. to obtain a solution C; 3 parts by mass of water and 1 part by mass of sodium dodecyl sulfate were mixed evenly and then added to the solution C; then 1 part by mass of formic acid and 3 parts by mass of water were dropped to the solution C to be mixed evenly to react for about 24 hours as keeping reaction conditions unchanged, to obtain the hydrophilic modified silica sol.

(b2) As counted in parts by mass, 35 parts by mass of the self-made hydrophilic modified silica sol and 56 parts by mass of commercially available silica sol were mixed with 5 parts by mass of titanium dioxide sol, a pH value of the system was adjusted to about 3.0 by using 4 parts by mass of the pH modifier, i.e., formic acid, and then the mixture was stirred under a water bath condition at about 50° C. to react for about 4 hours, to obtain the hydrophilic coating material.

2. Preparation of Heat Exchanger (c) Surfaces of a heat exchange pipe and/or a fin of the heat exchanger were pretreated, which specifically included: performing a sand-blasting treatment on the surfaces of the heat exchange pipe and/or the fin of the heat exchanger with white corundum of 150 meshes, cleaning the surfaces of the heat exchange pipe and/or the fin with anhydrous ethanol, and then drying them at 40° C.

(d) The rare earth conversion coating material obtained in step (a) was applied to the surfaces of the heat exchange pipe and/or the fin in step (c) by dip coating or spray coating. After standing for 40 min by maintaining the temperature at 50° C., it was taken out and dried by cold air or dried in the air naturally, to obtain the heat exchanger with a rare earth conversion coating.

(e) The hydrophilic coating material obtained in step (b) was applied to the surface of the heat exchanger with a rare earth conversion coating obtained in step (d) by dip coating or spray coating, where dip coating includes dipping for three times, and 2 min for each time, and cured for 1 hour at 200° C., to obtain the heat exchanger with a rare earth conversion coating and a hydrophilic coating.

Embodiments 2-6

A heat exchanger was manufactured in the same manner as in Embodiment 1, except for the preparation of the rare earth conversion coating material.

In Embodiment 2, the preparation of the rare earth conversion coating material involved: as counted in parts by mass, mixing 3 parts by mass of cerium nitrate hexahydrate and 1 part by mass of sodium chloride to obtain a mixture, adding the mixture to 96 parts by mass of deionized water, and stirring it mechanically until the solid was completely dissolved, to obtain a colorless and transparent solution; heating the solution to 55° C. with a water bath, then adding 3.5 parts by mass of an aqueous hydrogen peroxide (27.5 wt. %) solution to the solution, and continuously heating the solution to 55° C. to obtain the rare earth conversion coating material.

In Embodiment 3, the preparation of the rare earth conversion coating material involved: as counted in parts by mass, mixing 2 parts by mass of cerium nitrate hexahydrate and 0.8 parts by mass of sodium chloride to obtain a mixture, adding the mixture to 95.5 parts by mass of deionized water, and stirring it mechanically until the solid was completely dissolved, to obtain a colorless and transparent solution; heating the solution to 45° C. with a water bath, then adding 3.0 parts by mass of an aqueous hydrogen peroxide (27.5 wt. %) solution to the solution, and continuously heating the solution to 45° C. to obtain the rare earth conversion coating material.

In Embodiment 4, the preparation of the rare earth conversion coating material involved: as counted in parts by mass, mixing 1 part by mass of cerium sulfate tetrahydrate and 0.7 parts by mass of sodium chloride to obtain a mixture, adding the mixture to 95.1 parts by mass of deionized water, and stirring it mechanically until the solid was completely dissolved, to obtain a colorless and transparent solution; heating the solution to 50° C. with a water bath, then adding 2.5 parts by mass of an aqueous tert-butyl hydroperoxide (65 wt. %) solution to the solution, and continuously heating the solution to 50° C. to obtain the rare earth conversion coating material.

In Embodiment 5, the preparation of the rare earth conversion coating material involved: as counted in parts by mass, mixing 1.5 parts by mass of cerium chloride and 0.5 parts by mass of sodium chloride to obtain a mixture, adding the mixture to 95.5 parts by mass of deionized water, and stirring it mechanically until the solid was completely dissolved, to obtain a colorless and transparent solution; heating the solution to 55° C. with a water bath, then adding 2 parts by mass of an aqueous tert-butyl hydroperoxide (65 wt. %) solution to the solution, and continuously heating the solution to 55° C. to obtain the rare earth conversion coating material.

In Embodiment 6, the preparation of the rare earth conversion coating material involved: as counted in parts by mass, mixing 1.5 parts by mass of cerium nitrate hexahydrate and 0.5 parts by mass of sodium chloride to obtain a mixture, adding the mixture to 95.1 parts by mass of deionized water, and stirring it mechanically until the solid was completely dissolved, to obtain a colorless and transparent solution; heating the solution to 50° C. with a water bath, then adding 3.3 parts by mass of sodium perchlorate to the solution, and continuously heating the solution to 50° C. to obtain the rare earth conversion coating material.

The rest were the same as that in Embodiment 1.

Embodiments 7-12

A heat exchanger was manufactured in the same manner as in Embodiment 1, except for the preparation of the hydrophilic coating material. Embodiments 7-8 are mainly different from Embodiment 1 in step (b1), while Embodiments 9-10 are mainly different from Embodiment 1 in step (b2).

In Embodiment 7, the preparation of the hydrophilic coating material involved: (b1) as counted in parts by mass, mixing 32 parts by mass of KH-560, 8 parts by mass of ethyl orthosilicate and 53 parts by mass of anhydrous ethanol evenly by mechanical stirring under a water bath condition at about 50° C., to obtain a solution C; mixing 2.5 parts by mass of water and 0.5 parts by mass of sodium dodecyl sulfate evenly to obtain a mixture, and then adding the mixture to the solution C; then dropping 1.5 parts by mass of formic acid and 2.5 parts by mass of water to the solution C to be mixed evenly to react for about 24 hours under the unchanged reaction conditions, to obtain the hydrophilic modified silica sol.

In Embodiment 8, the preparation of the hydrophilic coating material involved: (b1) as counted in parts by mass, mixing 30 parts by mass of KH-560, 6 parts by mass of ethyl orthosilicate and 56 parts by mass of anhydrous ethanol evenly by mechanical stirring under a water bath condition at about 50° C. to obtain a solution C; mixing 2.6 parts by mass of water and 1.4 parts by mass of sodium dodecyl sulfate evenly to obtain a mixture , and then adding the mixture to the solution C; then dropping 1.2 parts by mass of formic acid and 2.8 parts by mass of water to the solution C to be mixed evenly to react for about 24 hours under the unchanged reaction conditions, to obtain the hydrophilic modified silica sol.

In Embodiment 9, the preparation of the hydrophilic coating material involved: (b2) as counted in parts by mass, mixing 37 parts by mass of the self-made hydrophilic modified silica sol, 55 parts by mass of commercially available silica sol and 5 parts by mass of titanium dioxide sol, adjusting a pH value of the system to about 3.0 by using 3 parts by mass of the pH modifier, i.e., formic acid, and then stirring under a water bath condition at about 50° C. to react for about 4 hours, to obtain the hydrophilic coating material.

In Embodiment 10, the preparation of the hydrophilic coating material involved:

(b2) as counted in parts by mass, mixing 34 parts by mass of the self-made hydrophilic modified silica sol, 56 parts by mass of commercially available silica sol and 5.5 parts by mass of titanium dioxide sol, adjusting a pH value of the system to about 3.0 by using 4.5 parts by mass of the pH modifier, i.e., formic acid, and then stirring under a water bath condition at about 50° C. to react for about 4 hours, to obtain the hydrophilic coating material.

In Embodiment 11, the preparation of the hydrophilic coating material involved: (b2) as counted in parts by mass, mixing 91 parts by mass of the self-made silica sol and 5 parts by mass of titanium dioxide sol, adjusting a pH value of the system to about 3.0 by using 4 parts by mass of the pH modifier, i.e., formic acid, and then stirring under a water bath condition at about 50° C. to react for about 4 hours, to obtain the hydrophilic coating material.

In Embodiment 12, the preparation of the hydrophilic coating material involved: (b2) as counted in parts by mass, mixing 91 parts by mass of commercially available silica sol and 5 parts by mass of titanium dioxide sol, adjusting a pH value of the system to about 3.0 by using 4 parts by mass of the pH modifier, i.e., formic acid, and then stirring under a water bath condition at about 50° C. to react for about 4 hours, to obtain the hydrophilic coating material.

The rest were the same as that in Embodiment 1.

COMPARATIVE EXAMPLE 1

Comparative Example 1 is different from Embodiment 1 in that the heat exchanger in Comparative Example 1 is not provided with the rare earth conversion coating and the hydrophilic coating.

Property Test

In order to facilitate the property test, the test was carried out by coating an aluminum sheet. That is, the aluminum sheet made of the same material as the heat exchangers in the above embodiments and the comparative example was used, and rare earth conversion coating material and hydrophilic coating material were applied to the aluminum sheet for testing. Specifically, the rare earth conversion coating material in Embodiments 1-12 was applied to the pretreated surface of the aluminum sheet, and the hydrophilic coating material was applied to the surface of the rare earth conversion coating, to obtain coated aluminum sheet test samples in Test Cases 1-12 corresponding to Embodiments 1-12. Control Case 1 relates to a blank aluminum sheet, that is, an aluminum foil without a rare earth conversion coating and a hydrophilic coating.

Certainly, in other embodiments, the heat exchanger may also be directly used for the measurement. In the present application, in order to facilitate the comparison, aluminum sheets made of the same material were used for comparative test, and test results are shown in Table 1 below. A test method is as follows.

1. Hydrophilicity Test (Contact Angle Test)

A test instrument was a contact angle measuring instrument, which measured a contact angle of a sample based on optical imaging principles and by image contour analysis. The contact angle refers to an angle formed when a drop of liquid is dropped on a horizontal plane of a solid, and a liquid phase is sandwiched between two tangent lines of a gas-liquid interface and a solid-liquid interface at a gas-liquid-solid three-phase junction on a surface of the solid.

During the test, the contact angle measuring instrument and a computer connected thereto were turned on, and testing software was turned on.

A specimen was put on a horizontal workbench, an amount of droplets was adjusted by a micro-sampler, the volume was generally about 1 μL, liquid was dropped on a needle to form droplets, a knob was rotated to move up the workbench, so that a surface of the specimen contacts the droplets, then the workbench was moved down, and the droplets may be left on the specimen.

The contact angle of this region was obtained by testing and data analysis conducted by the testing software. For each embodiment and the comparative example, 5 different points of the specimen were taken for testing and then averaged, which was denoted as the contact angle of the specimen in the embodiment and the comparative example.

2. Corrosion Resistance Test (Salt Spray Test)

Salt spray test was performed on the coated aluminum foil test samples in Test Cases 1-12 and Control Case 1. In the salt spray test, an acid salt spray test was conducted with reference to a test standard ASTM G85, and each specimen was put into a salt spray box and taken out every certain time to observe surface corrosion points.

TABLE 1

Results of property test in test cases and control cases

| Item | Salt spray test result | Salt spray test time | Initial contact angle |
| --- | --- | --- | --- |
| Test Case 1 | Slight corrosion spots on the surface | 72 hours | <10° |
| Test Case 2 | Slight corrosion spots on the surface | 72 hours | <10° |
| Test Case 3 | Slight corrosion spots on the surface | 72 hours | <10° |
| Test Case 4 | Slight corrosion spots on the surface | 72 hours | <10° |
| Test Case 5 | Slight corrosion spots on the surface | 72 hours | <10° |
| Test Case 6 | Local pitting corrosion on the surface | 72 hours | <10° |
| Test Case 7 | Slight corrosion spots on the surface | 72 hours | <10° |
| Test Case 8 | Local pitting corrosion on the surface | 72 hours | <10° |
| Test Case 9 | Slight corrosion spots on the surface | 72 hours | <10° |
| Test Case 10 | Slight corrosion spots on the surface | 72 hours | <10° |
| Test Case 11 | Slight corrosion spots on the surface | 24 hours | <10° |
| Test Case 12 | Local pitting corrosion on the surface | 24 hours | <10° |
| Control Case 1 | Dense multi-point corrosion on the surface | 24 hours | About 90° |

Test Cases 1 to 12 correspond to Embodiments 1 to 12 respectively, and the salt spray test result items from Test Cases 1 to 10 are to take out the samples and observe surface corrosion thereof after 72 hours of acid salt spray test. The salt spray test result items from Test Cases 11 to 12 are to take out the samples and observe surface corrosion thereof after 24 hours of acid salt spray test. Control Case 1 corresponds to Comparative Example 1, and the salt spray test result item of Control Case 1 is to take out the samples and observe surface corrosion thereof after 24 hours of acid salt spray test.

As can be seen from the data of Table 1, the contact angles of the rare earth conversion coating and the hydrophilic coating of the heat exchanger according to the present application are less than 10°, which indicates that the coating in the present application increases the hydrophilicity, has excellent hydrophilicity, and can promote the discharge of the condensate water. Moreover, after 72 hours of acid salt spray test, the surface morphology remains good. In most embodiments, only slight corrosion spots appear on the surface, which indicates that the corrosion resistance is excellent, the heat exchange performance of the heat exchanger can be ensured, and the service life of the heat exchanger can be prolonged. As can be seen from the comparisons between Embodiment 1 and Embodiments 11 and 12, the mixing of the self-made silica sol according to the embodiments of the present application with the commercially available silica sol can further improve the hydrophilicity and corrosion resistance of the coating.

In addition, leakage occurred after the test sample of Embodiment 1 was tested by acid salt spray for 2032 hours, showing excellent corrosion resistance.

It shall be noted that, if the heat exchanger products are used for the corrosion resistance test, the following manner may be adopted. After the heat exchanger is covered with the rare earth conversion layer and the hydrophilic coating, nitrogen is filled into an inner cavity of the heat exchanger to the pressure of 1 MPa, and then an inlet and an outlet of the heat exchanger are sealed, leaving a pipe for connecting with a barometer. Then, the heat exchanger is put in the salt spray box for salt spray test, to observe changes in the pressure of the barometer. Part of the surface heat exchanger is corroded and perforated when the pressure drops, which is denoted as failure of the heat exchanger. In practice, the corrosion resistance of the heat exchanger may be judged by comparing the time it takes for pressure of the heat exchanger to drop to a certain value.

Figure 8:
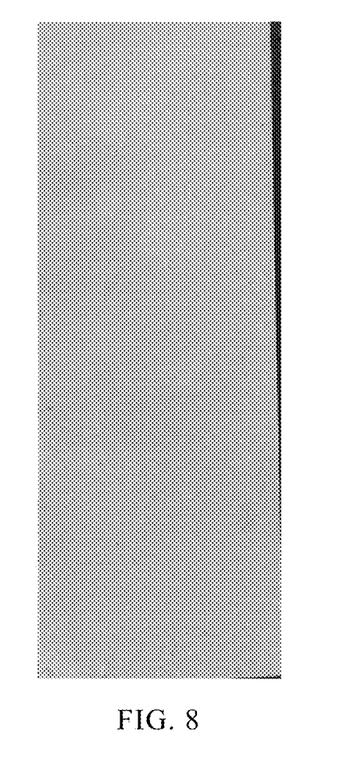
FIG. 8 shows a morphology of a sample after a salt spray test according to Embodiment 1 of the present application.
Figure 9:
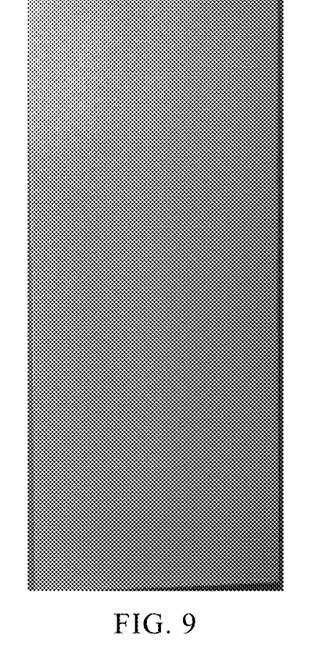
Figure 10:
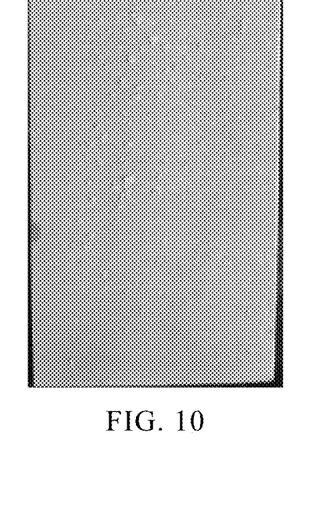
FIG. 10 shows a morphology of a sample after the salt spray test according to Comparative Example 1 of the present application.

FIG. 8 shows a morphology after a salt spray test on a sample according to Embodiment 1 of the present application. As can be seen from FIG. 8, the sample of Embodiment 1 remains relatively intact after 72 hours of the acid salt spray test, with only slight corrosion spots on the surface, which indicates good corrosion resistance. FIG. 9 shows a morphology prior to a salt spray test on a sample according to Comparative Example 1 of the present application. FIG. 10 shows a morphology after the salt spray test on the sample according to Comparative Example 1 of the present application. As can be seen from the comparisons between FIG. 9 and FIG. 10, many irregular granular corrosion spots appear in the sample of Comparative Example 1 after 24 hours of an acid salt spray test, and a morphology difference is obvious before and after the test, which indicates that the corrosion problem is more obvious and serious for a bare board without a rare earth conversion coating and a hydrophilic coating.

In the description of the present application, reference terms such as "one embodiment", "some embodiments", "exemplary embodiments", "example(s)", "specific example(s)" and "some examples" mean that a specific feature, structure, material, or characteristic described in connection with the embodiment or example is included in at least one embodiment or example of the present application. In the specification, the schematic expressions of the above terms are not necessarily referring to the same embodiment or example. In addition, the described specific features, structures, materials or characteristics may be combined in one or more embodiments or examples in an appropriate manner. Location terms such as "up", "down", "inside" and "outside" described in the embodiments of the present application are described from the angles as shown in the accompanying drawings and should not be understood as limitations on the embodiments of the present application.

Although the embodiments of the present application have been shown and described, those of ordinary skill in the art may understand that changes, modifications, replacements and variations may be made to these embodiments without departing from the principle and purpose of the present application, and the scope of the present application is limited by the claims and equivalents thereof.

What is claimed is:

1. A heat exchanger, comprising:
    a metal substrate having a fluid channel for circulating a heat exchange medium; and
    a coating comprising a rare earth conversion coating and a hydrophilic coating;
    wherein the rare earth conversion coating is arranged to cover at least part of a surface of the metal substrate, and the rare earth conversion coating comprises a rare earth element-containing compound; at least part of the hydrophilic coating is further away from the metal substrate than the rare earth conversion coating; and
    wherein a weight per unit area of the rare earth conversion coating ranges from 0.75 g/m$^2$ to 1.5 g/m$^2$, and a weight per unit area of the hydrophilic coating ranges from 4 g/m$^2$ to 10 g/m$^2$.

2. The heat exchanger according to claim 1, wherein the rare earth conversion coating is connected to the metal substrate by covalent bond; and
    the hydrophilic coating is arranged to cover at least part of a surface of the rare earth conversion coating, the hydrophilic coating is connected to the rare earth conversion coating by covalent bond, and the hydrophilic coating is exposed to an environment.

3. The heat exchanger according to claim 1, wherein the hydrophilic coating comprises silica.

4. The heat exchanger according to claim 3, wherein at least part of the silica is hydrophilic modified silica with a particle size in nanometer scale.

5. The heat exchanger according to claim 4, wherein the hydrophilic coating comprises titanium dioxide, and a content of the silica in hydrophilic coating is greater than that of the titanium dioxide.

6. The heat exchanger according to claim 1, wherein the metal substrate comprises a collecting pipe, a fin and a heat exchange pipe, the heat exchange pipe is fixed to the collecting pipe, the fin is retained to the heat exchange pipe; an inner cavity of the heat exchange pipe is communicated with an inner cavity of the collecting pipe; and
    the coating is arranged to cover at least part of a surface of at least one of the collecting pipe, the fin and the heat exchange pipe.

7. The heat exchanger according to claim 6, wherein an outer surface of the metal substrate has an uneven rough surface, roughness of the rough surface is defined as Ra, the roughness of the rough surface meets the following relation $0.5\ \mu m \leq Ra \leq 10\ \mu m$, and the coating is arranged to cover at least part of the rough surface.

8. The heat exchanger according to claim 1, wherein a rare earth element in the rare earth element-containing compound comprises at least one of a lanthanum element, a cerium element, a praseodymium element, a neodymium element, a promethium element, a samarium element, or a europium element.

9. The heat exchanger according to claim 1, wherein the rare earth element-containing compound comprises an oxide of cerium and a hydroxide of cerium.

10. The heat exchanger according to claim 1, wherein the coating comprises at least one functional coating, and at least part of the functional coating is located between the rare earth conversion coating and the hydrophilic coating.

11. A manufacturing method of a heat exchanger, comprising:
    providing a metal substrate, a rare earth conversion coating material and a hydrophilic coating material, wherein the metal substrate has at least one fluid channel for circulating a heat exchange medium;
    applying the rare earth conversion coating material to at least part of a surface of the metal substrate, and curing, to obtain a rare earth conversion coating, wherein the rare earth conversion coating material comprising a rare earth element-containing compound; and
    applying the hydrophilic coating material to at least part of a surface of the rare earth conversion coating, and curing, to obtain the heat exchanger;
    wherein a weight per unit area of the rare earth conversion coating ranges from 0.75 g/m$^2$ to 1.5 g/m$^2$, and a weight per unit area of the hydrophilic coating ranges from 4 g/m$^2$ to 10 g/m$^2$.

12. The manufacturing method according to claim 11, wherein a preparing method of the rare earth conversion coating material comprises:
    dissolving 1 to 3 parts by mass of a rare earth raw material in 94 to 96 parts by mass of water, to obtain a solution A;
    heating the solution A to 45° C. to 55° C.; and
    adding 1.5 to 4.5 parts by mass of an oxidant to the solution A to obtain the rare earth conversion coating material.

13. The manufacturing method according to claim 12, wherein the rare earth conversion coating material has at least one of the following features:
    a) the rare earth raw material comprises at least one of a cerium nitrate hexahydrate, an anhydrous cerium nitrate, a cerium chloride, a polyhydrous compound of the cerium chloride, a cerium sulfate, a polyhydrous compound of the cerium sulfate, a cerium acetate and a polyhydrous compound of the cerium acetate;
    b) the oxidant comprises 1.5 to 4.5 parts by mass of hydrogen peroxide, or 1.5 to 4.5 parts by mass of sodium perchlorate; or 1.2 to 3.6 parts by mass of tert-butyl hydroperoxide; and
    c) the solution A further contains 0 to 1 part by mass of an accelerant, and the accelerant comprises a sodium chloride.

14. The manufacturing method according to claim 13, wherein a preparing method of the hydrophilic coating material comprises:
    mixing 90 to 92 parts by mass of hydrophilic modified silica sol and 4 to 6 parts by mass of titanium dioxide sol to obtain a mixture, adjusting a pH value of the mixture to 2.5 to 3.5 by adding 3 to 5 parts by mass of a pH modifier, and then stirring to react at 45° C. to 55° C. for 3.5 hours to 5 hours, to obtain the hydrophilic coating material.

15. The manufacturing method according to claim 14, wherein a preparing method of at least part of the hydrophilic modified silica sol comprises:

mixing 36 to 40 parts by mass of a silane precursor and 50 to 56 parts by mass of a solvent at 45° C. to 55° C., adding 2 to 4 parts by mass of water and 0.5 to 1.5 parts by mass of a surfactant, mixing, and then adding 1 to 2 parts by mass of acid and 2 to 4 parts by mass of water to react for 22 hours to 24 hours, to obtain the hydrophilic modified silica sol.

16. The manufacturing method of according to claim 15, wherein the hydrophilic modified silica sol has at least one of the following features:

a) the silane precursor comprises 30 to 32 parts by mass of y-glycidyl ether oxypropyl trimethoxysilane and 6 to 8 parts by mass of ethyl orthosilicate;
b) the solvent comprises an alcohol solvent;
c) the surfactant comprises at least one of sodium dodecyl sulfate, sodium dodecyl sulfonate, sodium dodecyl benzene sulfonate or cetyl benzene sulfonate; and
d) the acid comprises at least one of formic acid or acetic acid.

17. The manufacturing method according to claim 12, further comprising a step of pretreating the metal substrate prior to applying the rare earth conversion coating material, and the step of pretreating the metal substrate comprises:

performing a sand-blasting treatment of 100 to 200 meshes on the at least part of a surface of the metal substrate, and then cleaning the metal substrate with alcohol or acid, and subsequently drying.

18. The manufacturing method according to claim 12, further comprising at least one of the following features:

wherein the applying the rare earth conversion coating material to at least part of a surface of the metal substrate, and curing, comprises: applying the rare earth conversion coating material to the at least part of the surface of the metal substrate by at least one of dip coating, spray coating, brush coating, curtain coating and roller coating, standing at 30° C. to 55° C. for 30 min to 50 min, and then taking the metal substrate out for air seasoning or drying; and wherein the applying the hydrophilic coating material to at least part of a surface of the rare earth conversion coating, and curing, comprises: applying the hydrophilic coating material to the at least part of the surface of the rare earth conversion coating by at least one of dip coating, spray coating, brush coating, curtain coating and roller coating, and curing at 180° C. to 220° C. for 0.5 hours to 2 hours.

19. A heat exchanger, comprising:

a first collecting pipe defining a first chamber;

a second collecting pipe defining a second chamber, the second collecting pipe being separated from the first collecting pipe;

a plurality of flat tubes connecting the first collecting pipe to the second collecting pipe, each of the flat tube defining a row of micro-channels, the micro-channels being fluidic communication with the first chamber and the second chamber for flowing refrigerant therebetween;

a plurality of corrugated fins each sandwiched between two adjacent flat tubes, the fin comprising a plurality of crests connecting to one of the two adjacent flat tubes and a plurality of troughs connecting to the other one of the two adjacent flat tubes; and a coating layer comprising a rare earth conversion coating layer and a hydrophilic coating layer, the rare earth conversion coating layer attached to at least one surface of the corrugated fin, the flat tube, and the collecting pipe;

wherein the hydrophilic coating layer is stacked on the rare earth conversion coating layer, and the rare earth conversion coating layer is sandwiched between the hydrophilic coating and the at least one surface of the corrugated fin, the flat tube, and the collecting pipe; and wherein a weight per unit area of the rare earth conversion coating ranges from 0.75 $g/m^2$ to 1.5 $g/m^2$, and a weight per unit area of the hydrophilic coating ranges from 4 $g/m^2$ to 10 $g/m^2$.

\* \* \* \* \*